United States Patent [19]

Han et al.

[11] Patent Number: 5,597,055
[45] Date of Patent: Jan. 28, 1997

[54] CLAMPED TUBE TYPE IMPACT ABSORBER

[75] Inventors: Wei-kuo Han; Chung-Hsiung Cheng, both of Hsinchu, Taiwan

[73] Assignee: Industrial Technology Research Institute, Hsinchu, Taiwan

[21] Appl. No.: 518,207

[22] Filed: Aug. 22, 1995

[51] Int. Cl.⁶ .................................................. F16F 7/12
[52] U.S. Cl. .................................................. 188/371
[58] Field of Search .................... 188/371, 372, 188/374, 376; 293/133, 134; 297/216.11, 216.14, 216.15, 216.17; 280/777; 74/492; 296/189

[56] References Cited

U.S. PATENT DOCUMENTS

| | | | |
|---|---|---|---|
| 3,181,821 | 5/1965 | Webb | 188/371 |
| 3,392,599 | 7/1968 | White | 188/371 |
| 3,833,093 | 9/1974 | Robinson | 74/492 |
| 3,847,252 | 11/1974 | Casciola | 188/374 |
| 3,887,223 | 6/1975 | Bez | 188/371 |
| 3,899,047 | 8/1975 | Maeda et al. | 188/374 |
| 4,006,647 | 2/1977 | Oonuma et al. | 188/371 |
| 4,346,795 | 8/1982 | Herbert | 188/375 |
| 5,086,661 | 2/1992 | Hancock | 74/492 |
| 5,152,578 | 10/1992 | Kiguchi | 297/216 |

*Primary Examiner*—Robert J. Oberleitner
*Assistant Examiner*—Chris Schwartz
*Attorney, Agent, or Firm*—W. Wayne Liauh

[57] ABSTRACT

An impact absorber is disclosed which comprises: (a) a substantially square inner tube with a plurality of opposing walls each wall having an exterior surface, wherein the inner tube has at least a pair of concave indentations formed on the exterior surfaces of two opposing walls, respectively, of the inner tube; (b) a substantially square outer tube with a plurality of opposing walls each wall having an interior surface. The outer tube has at least a pair of arc-shaped convex elements formed on the interior surfaces of two opposing walls, respectively, of the outer tube at locations corresponding to those of the concave indentations formed on the inner tube. The arc-shaped convex element are dimensioned such that they can be exactly embedded into the concave indentations of the inner tube. The inner tube is made of a deformable material such that during impact and the inner tube and the outer tube stretch or extend relative to each other, the arc-shaped convent elements on the outer tube will form respective channels on the exterior surfaces of the inner tube so as to absorb impact.

3 Claims, 6 Drawing Sheets

CLAMPED TUBE TYPE IMPACT ABSORBER

FIELD OF THE INVENTION

The present invention discloses an improved impact absorber mainly to be installed under passenger seats of an aircraft and is able to absorb impact forces during emergency landings or similar accidents, to safeguard the passengers.

BACKGROUND OF THE INVENTION

Because the flight speed of an airplane is very high, its passengers may have to bear a strong downward and forward impact force, when taking an emergency landing. Therefore, most impact absorbers are installed in the passengers' seats to protect the passengers from possible injuries resulting from the impact forces.

The impact absorber mainly utilizes its plastic deformation to absorb the impact energy to which the seats are subjected. There are various kinds of impact absorbers used in all types of airplanes nowadays, such as the inside-out type double-layer tube as shown in FIG. 1, consisting of an inner tube 10 and an outer tube 11. The inner tube 10 is an inside-out double-layer tube body in which the outer edge of the inner tube 10 is firmly connected to the inside edge of the outer tube 11.

As the impact absorber within the seat structure is subjected to bumping, the inner and outer tubes within the impact absorber creates a corresponding stretching in the opposite direction. As shown in FIG. 2, the required energy generated by the inside-out deformation when the inner tube is subjected to stretching, can be shared by the impulse generated by the seats and the passengers, thereby reducing the impact effect and protects the human body from being injured.

FIG. 3 illustrates another prior art. It is an ARA energy absorber which has an inner tube 12 housed in an outer tube 13. The inner tube 12 has a rolling torus 14 firmly secured around its circumference. The rolling torus 14 is tightly and slidably engaged with the inside surface of the outer tube 13. Dotted lines in FIG. 3 show the position of the rolling torus 14 before the impact force is applied. When impact force is applied, the inner tube 12 will be partly pulled out of the outer tube 13. Rolling toms 14 will move axially and exert friction force against the inside surface of the outer tube 13, and thus creating plastic deformation on the outer tube and therefore can absorb the impact forces.

FIG. 4, 5, and 6 depict yet another prior art disclosed in U.S. Pat. No. 5,152,578. It has an outer tube 16 which houses an inner tube 15. At one end of the inner tube 15 located within the outer tube, there is provided a truncated cone attachment 18. The outer tube 16 which tightly surrounds the cone attachment 18 is tapered with a bell-bottom shape opening 17. When impact force is applied, the inner tube 15 will be partly pulled out. The truncated cone attachment 18 will be moved axially and produce plastic deformation on the outer tube (as shown in FIG. 6). Therefore, the impact force will be absorbed. FIG. 5 shows one of the possible embodiments. It has four convex arcs around the circumference of the cone attachment 18. Only the convex arc areas can have contact with the outer tube and create the plastic deformation. Changing the length of the convex arc can change the capability of absorbing the impact force. However, the maximum length of the convex arcs is the circumferential length of the cone attachment 18. Therefore, it has a maximum limitation in the impact force absorbing capability.

There are three disadvantages according to the prior art of impact absorbers:
1. Their capability to absorb the impact force is highly dependent on the material properties (e.g. mechanical strength, rigidity, etc.), and the dimensional tolerance of the parts involved. The exact amount of impact force they can absorb is difficult to determine or control. Maintaining consistent product quality becomes a serious manufacturing problem.
2. On the design work, the manufacturer has to obtain the amount of impulse absorption capability by means of experimentation. When it comes to designing the change of impulse absorption capability, the manufacturer has to repeat the experimental work until the required new design is obtained.
3. Although the U.S. Pat. No. 5,152,578 disclosure can partly solve the problems set forth above, its capability to absorb the impact force is limited by the total circumferential length of the cone attachment.

SUMMARY OF THE INVENTION

In view of the disadvantages of the available impact absorbers, the inventors thereby, have improved, innovated, and developed the present invention of a seat impact absorber. The main purpose of the present invention is to provide an improved product which meets the safety design requirements and can easily satisfy the requirements of impulse absorption capability.

Another purpose of the present invention is to provide a kind of impact absorber which is more compact in structure and easier to manufacture.

DETAILED DESCRIPTION OF THE DRAWINGS

Figure 1:
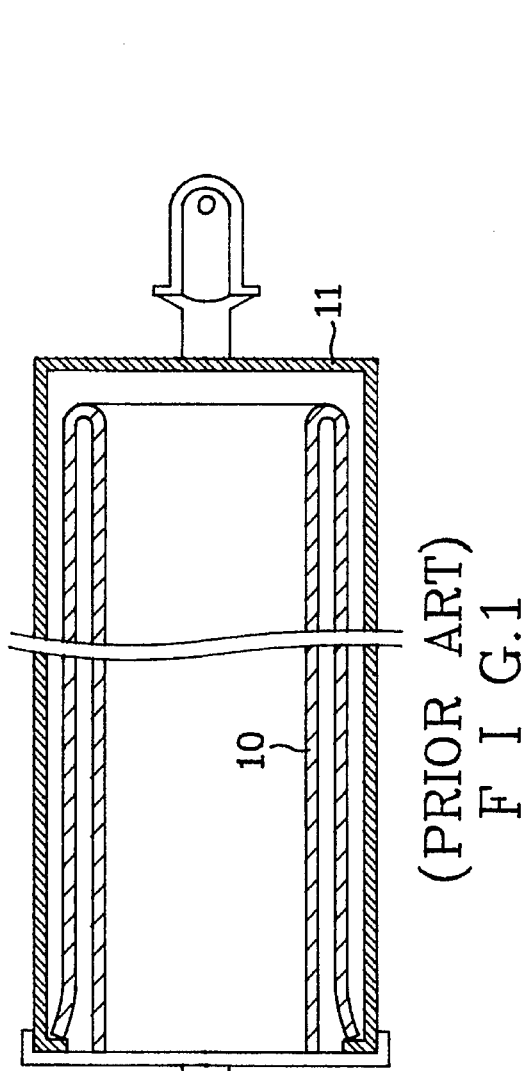
FIG. 1 is a cross-sectional view of the prior art inside-out type of impact absorber.
Figure 2:
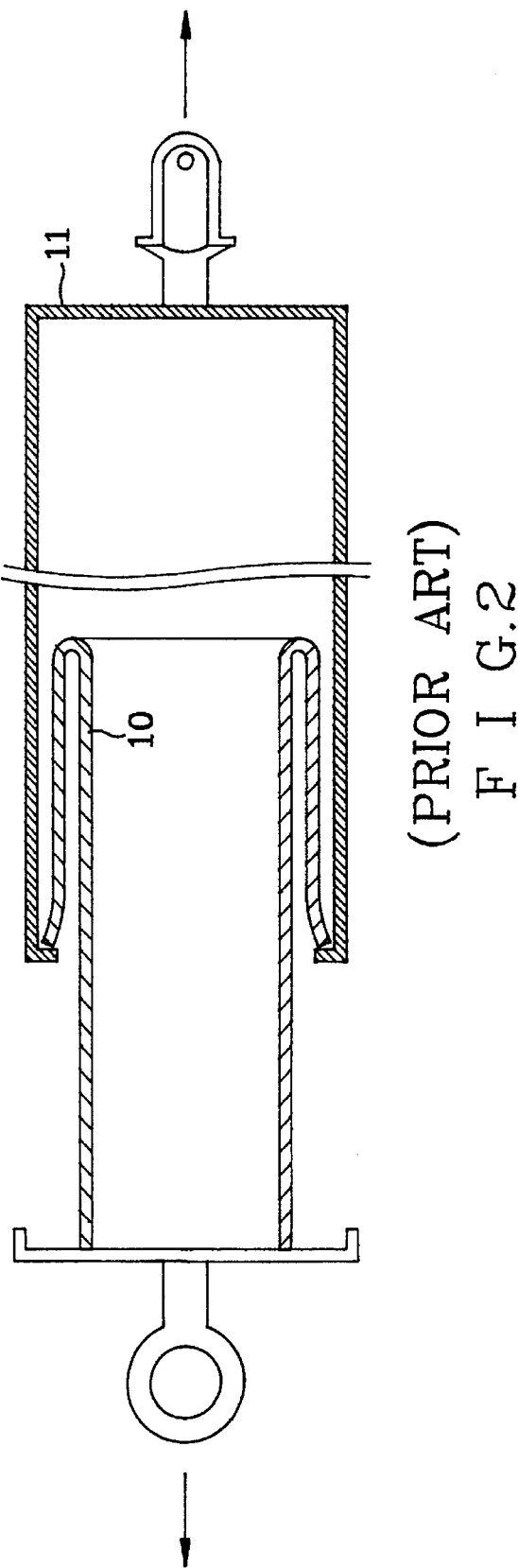
FIG. 2 is an illustration of the state after stretching of the prior art inside-out type of impact absorber.
Figure 3:
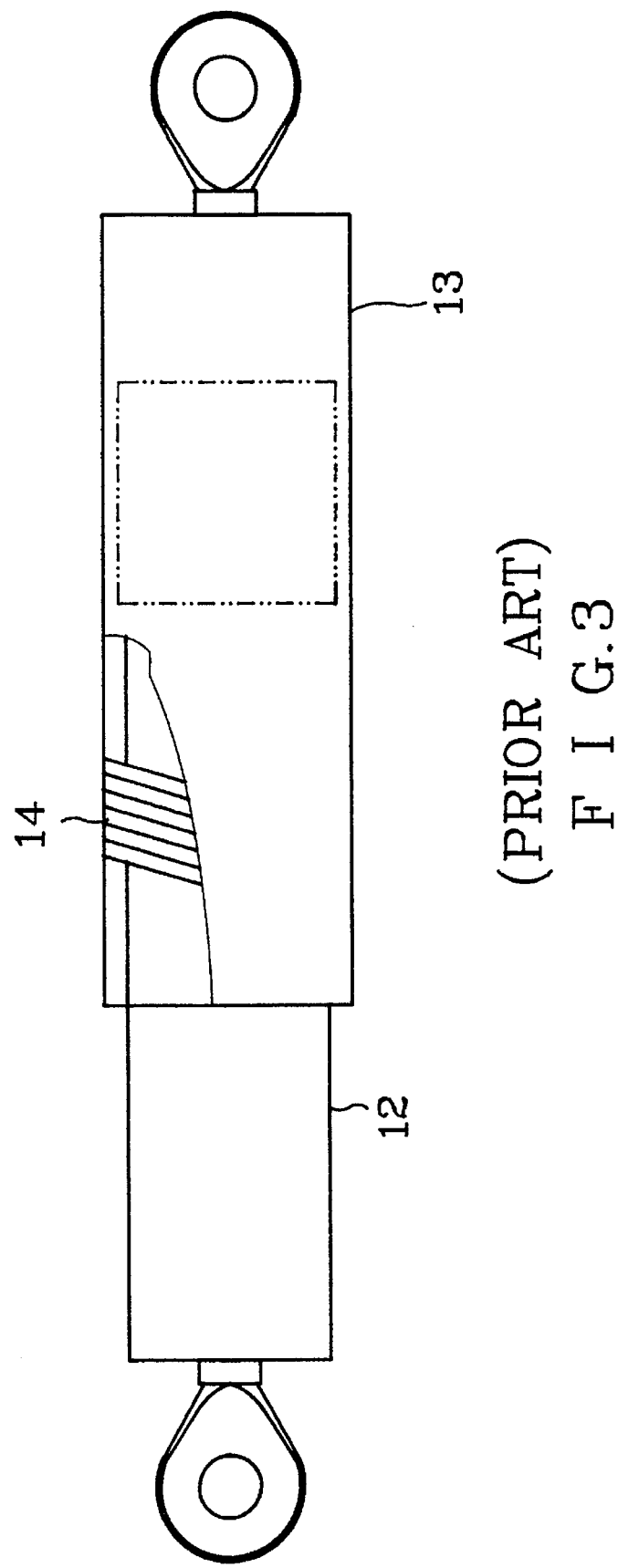
FIG. 3 is a cross-sectional view of another prior art of an ARA impact absorber.
Figure 4:
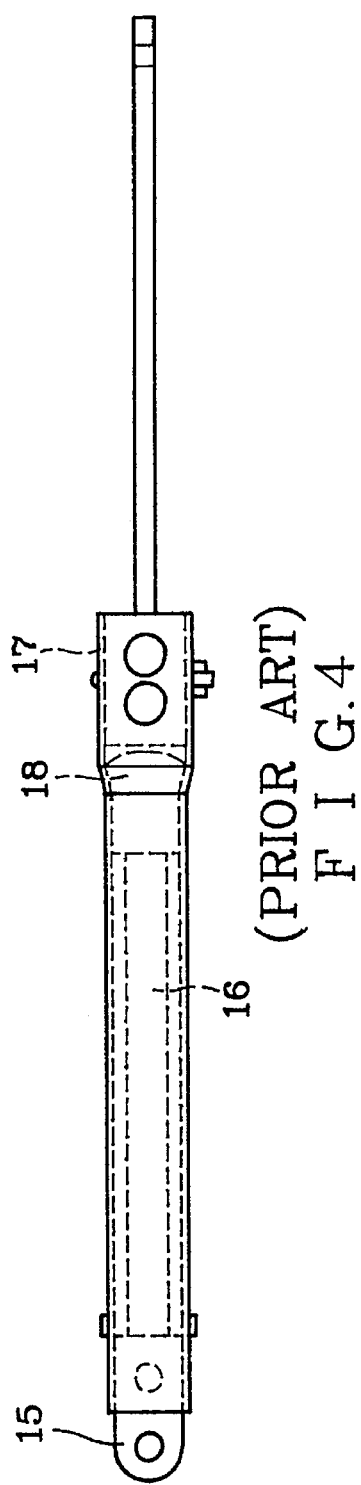
FIG. 4 is the side elevational view of the impact absorber disclosed in U.S. Pat. No. 5,152,578
Figure 6:
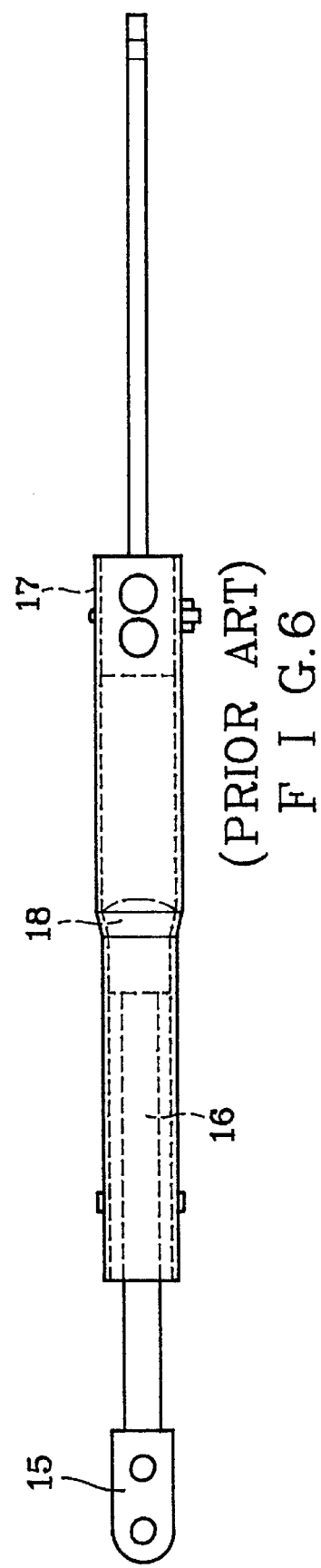
FIG. 6 is another side elevational view of the embodiment in FIG. 4 with the inner tube being stretched.
Figure 5:
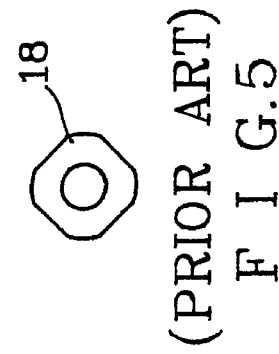
FIG. 5 is the end view of a cone attachment used in prior art of impact absorber.
Figure 7:
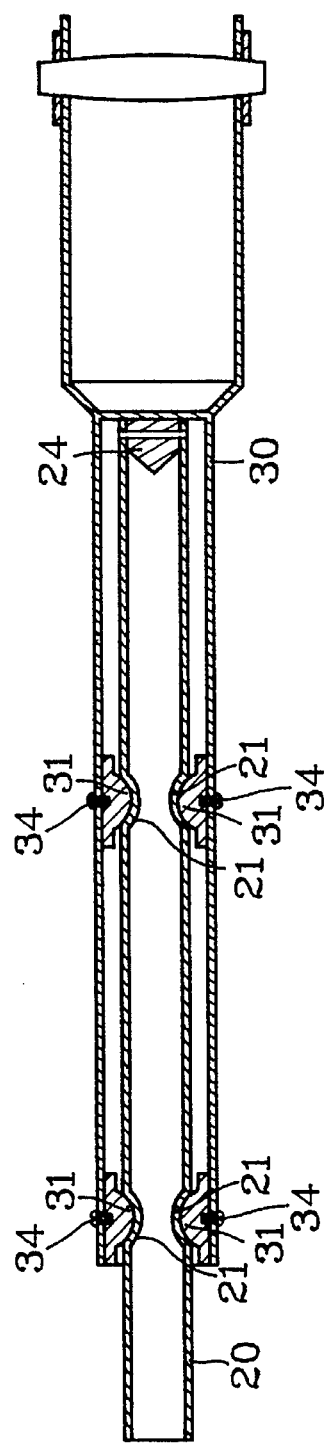
FIG. 7 is a structural diagram of the present invention.

The impact absorber provided by the present invention, as shown in FIG. 7, consists of an inner tube 20 and an outer tube 30, both of which are square tube bodies. There are indentations 21 concaved inward at the opposite locations of the inner tube's corresponding exterior surface. And there is a stop pin 24 set up at the end of the inner tube. Also, there are arc-shaped convex elements 31 set up at appropriate locations at the two opposing interior end surfaces of the outer tube 30. These arc-shaped convex elements 31 can be exactly embedded into indentations 21 of the inner tube 20; the arc-shaped convex element 31 of the outer tube has two perpendicular arcs, one of which has an arc in the same direction of the stretching of the inner tube 20.

Figure 8:
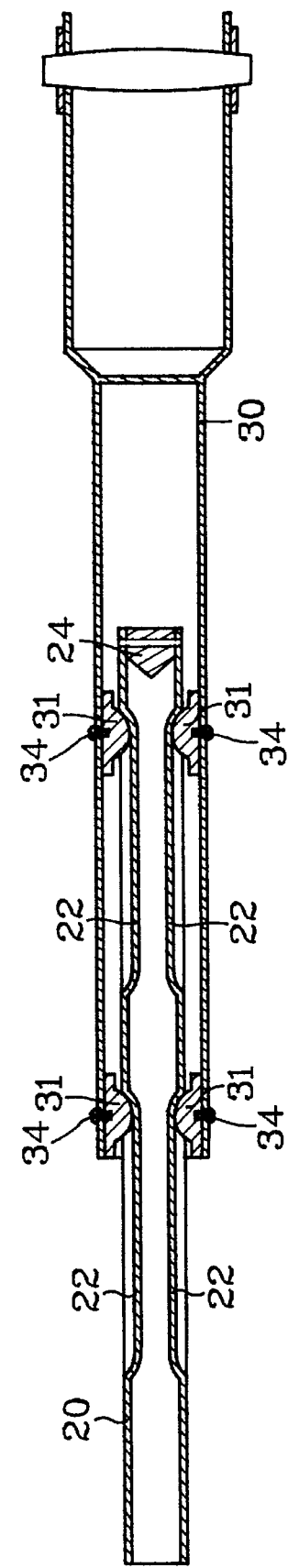
FIG. 8 is another cross-sectional view of the present invention according to FIG. 7 with the inner tube being stretched.

The present invention can set up two indentations 21 in an appropriate interval on the two opposite exterior end surfaces at the inner tube 20, thus setting up two arc-shaped convex elements 31 on the two corresponding exterior end surfaces of the outer tube 30 to become a design of two sets of convex elements 31 and an indentation. As shown in FIG. 7, when the inner and outer tubes, 20 and 30 respectively, are subjected to stretching in opposite directions, as shown in FIG. 8, the convex elements 31 on the outer tube 30 push to deform the exterior surface of the inner tube 20 and become a concave channel 22 (locus). The required energy of the plastic deformation created by the inner tube 20 to generate channels 22 is the energy provided by the stretching of the inner and outer tubes, 20 and 30, respectively, thereby, it can attain the object of absorbing the impulse.

Depending on the design requirements, one can make use of up, down, and left hand, and right hand sides to form pairs, and front and rear permutation to form a specific combination in order to determine the magnitude of the impact absorption.

For instance, the present invention utilizes the design of fitting, that is, the up-and-down pair and the front-and-rear permutation, two groups of concave indentation 21, and convex element 31 as shown in FIG. 7. The impact absorption capability can reach as high as two times that of having only one group.

Figure 11:
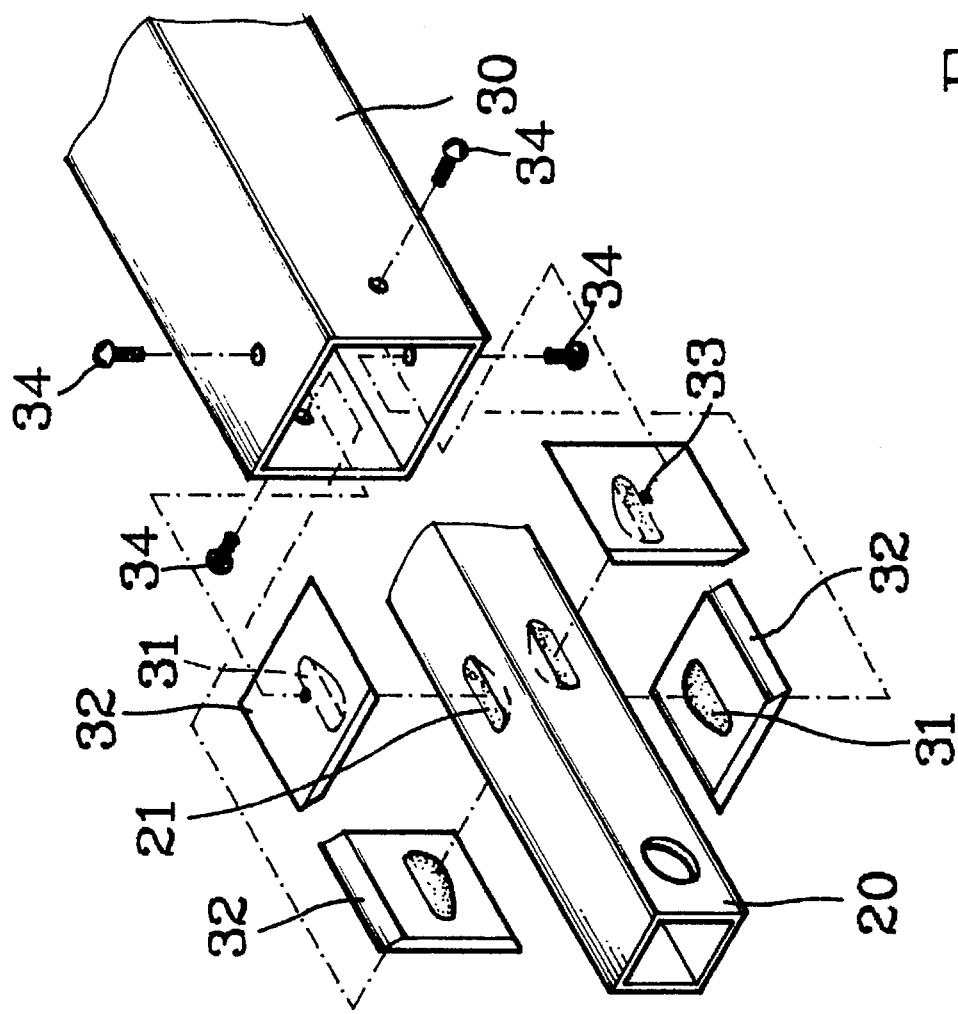
FIG. 11 is an exploded view of the inner and outer tubes' assembly of the preferred embodiment.

There are many ways of forming convex elements 31 on the interior surface of the outer tube of the present invention. The preferred embodiment, as shown in FIG. 11, utilizes four metal pieces 32 having an arc shape convex element 31 on each metal piece, to enclose a tube body. The procedure involves: aligning each convex element 31 to embed into the concave indentation 21 on the exterior surface of the inner tube 20, thereafter, placing them all together into the outer tube 30 and tying them together by threads to fix the metal pieces 32 in position. If only one pair of convex elements 31 and concave indentations 21 are to be designed, then there is no convex element 31 set up on another pair of metal pieces 32.

The principal advantage of the present invention is that whenever a design of the number of pairs of concave indentations 21 and convex points 31 is to obtain the required energy of the plastic deformation of its inner tube 20 during the stretching test, we can simply obtain the accurate number of pairs of concave indentations 21 and convex points 31 in accordance with the required absorption capability for different impact absorbers without conducting another experiment. This way, one can simplify the design work of changing the impact abortion capability with accuracy.

The present invention utilizes the arc shape for the squeezing and pressing of the convex element 31 associated with the high speed stretching action during the dynamic impact process, thereby, the result of being squeezed and pressed causes a channel shape plastic deformation.

In the present invention, the outer tube's rigidity must be higher than the inner tube's hardness, and the material of the inner tube can be different and one can obtain the impact absorption capability for various kinds of material by performing tests for the design of a pair of convex points 31 and concave indentations 21. This way, the present invention can quickly obtain an accurate design for any impact absorption capability required.

The present invention not only attains the advantage of great flexibility which allows it to be easily and accurately set up so as to accommodate different impact absorption requirements, it also simplifies the structural design, which allows it to become more compact in comparison with the commercially available impact absorbers. It is also easy to manufacture and is a good design with a technology breakthrough in nature.

Figure 9:
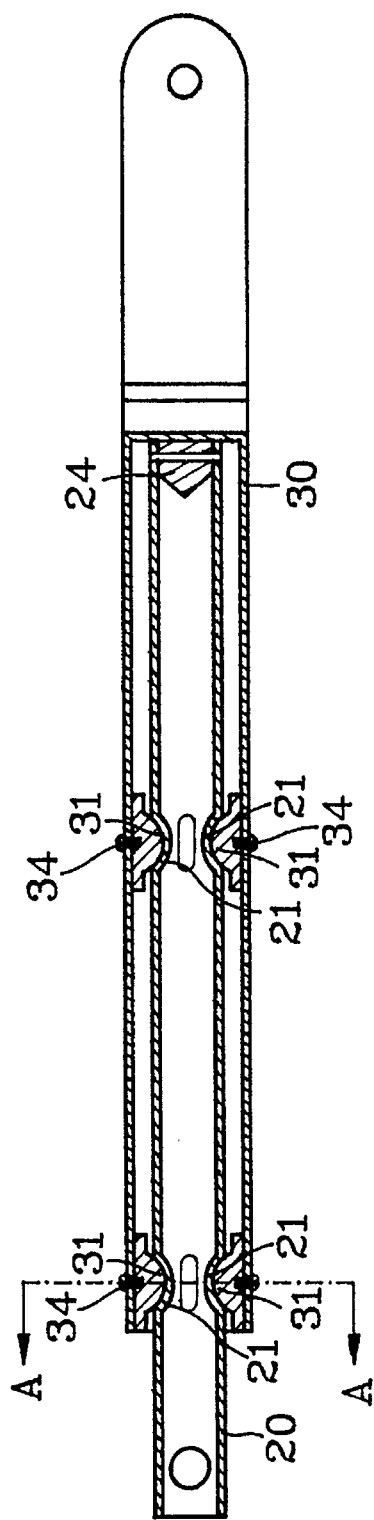
FIG. 9 is the another preferred embodiment of the present invention.

The preferred embodiment of the present invention is further described as follows. FIGS. 7 and 8 illustrate a preferred embodiment according to the present invention. It includes a substantially square inner tube 20 housed in a substantially square outer tube 30. The inner tube 20 has at least one pair of indentations 21 formed on the exterior surfaces of the two opposite walls thereof (also shown in FIGS. 10 and 11). Each pair of indentations 21 are substantially located on the same cross-sectional plane. Each cross-sectional plane may therefore have maximum four indentations. When more than four indentations are needed, two or more cross-sectional planes are be allocated (as shown in FIGS. 7 and 9).

Figure 10:
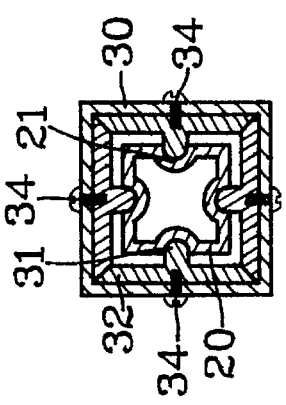
FIG. 10 is a cross-sectional view of FIG. 9 along line A—A.

There is a wedge member (i.e., a metal piece) 32 sandwiched between the inner tube 20 and the outer tube 30. On one lateral wall of the wedge member 32, there is provided a convex element 31 which is slidably engaged with an indentation 21. In another lateral wall of the wedge member 32, there is a screw aperture 33 formed therein (as shown in FIG. 11). The wedge member 32 is secured on the inside surface of the outer tube 30 by means of a screw 34 engaging with the screw aperture 33 (as shown in FIG. 10 and 11). There is a stop stud 24 disposed at one end of the inner tube 20 located inside of the outer tube 30.

The materials of the outer tube 30, the wedge member 32, and the convex element 31 all should have greater mechanical strength and rigidity than the inner tube 20. When an impact force is applied to the present invention, the inner tube 20 and the outer tube 30 will be moved, respectively, in the opposite directions. The wall of the inner tube 20 adjacent the indentation 21 will be pressed by the convex element 31 and form a concave channel locus 22 resulting from plastic deformation. This is the reason why it can absorb the impact force.

The capability of absorbing the impact force by a pair of convex elements depends on a number of factors, including the size and shape of the indentation, the tolerance between the convex member and the indentation, the mechanical strength of the inner tube, and the thickness of the inner tube.

Once the impact force absorbing capability of a pair of convex elements 31 is determined, the total impact absorbing capacity can be easily calculated by providing the required number of pairs of wedge members 32. Of course, a sufficient number of indentation 21 should be preformed on the inner tube 20. The present invention thus can be flexibly configured to meet a wide range of impact force absorbing requirements by including the number of required pairs of wedge members, such as one, two, three or four pairs.

For installation, the number of the required wedge member 32 should be determined first according to the impact force absorbing requirements. The wedge members 32 are disposed on the indentation 21. The inner tube 20 is then moved into the outer tube 30. Then a screw 34 is inserted through an opening in the outer tube 30 and is fixed in a screw aperture 33 in a wedge member 32 (as shown in FIGS. 10 and 11).

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An impact absorber comprising:
   (a) a substantially square inner tube with a plurality of opposing walls each wall having an exterior surface, wherein the inner tube has at least a pair of concave identations formed on the exterior surfaces of two opposing walls, respectively, of the inner tube;
   (b) a substantially square outer tube with a plurality of opposing walls each wall having an interior surface, wherein the outer tube has at least a pair of arc-shaped convex elements formed on the interior surfaces of two opposing walls, respectively, of the outer tube at locations corresponding to those of the concave indentations formed on the inner tube, the arc-shaped convex elements are dimensioned such that they can be exactly embedded into the concave identations of the inner tube; and
   (c) further wherein the inner tube is made of a deformable material such that during an impact the inner tube and the outer tube stretch or extend relative to each other, the arc-shaped convex elements on the outer tube forming respective channels on the exterior surfaces of the inner tube so as to absorb impact.

2. An impact absorber as claimed in claim 1 wherein the inner tube is provided with more than one pair of the concave indentations and the outer tube is provided with more then one pair of the corresponding arc-shaped convex elements.

3. An impact absorber as claimed in claim 1 wherein the arc-shaped convex elements are affixed to the outer tube with a screw means.

* * * * *